(12) United States Patent
Hama et al.

(10) Patent No.: US 11,591,266 B2
(45) Date of Patent: Feb. 28, 2023

(54) CUBIC BORON NITRIDE SINTERED MATERIAL

(71) Applicants: SUMITOMO ELECTRIC INDUSTRIES, LTD., Osaka (JP); SUMITOMO ELECTRIC HARDMETAL CORP., Hyogo (JP)

(72) Inventors: Hisaya Hama, Osaka (JP); Katsumi Okamura, Osaka (JP); Akito Ishii, Osaka (JP); Satoru Kukino, Hyogo (JP)

(73) Assignees: Sumitomo Electric Industries, Ltd., Osaka (JP); SUMITOMO ELECTRIC HARDMETAL CORP., Hyogo (JP)

( * ) Notice: Subject to any disclaimer, the term of this patent is extended or adjusted under 35 U.S.C. 154(b) by 0 days.

(21) Appl. No.: 17/625,750

(22) PCT Filed: Jul. 17, 2020

(86) PCT No.: PCT/JP2020/027901
§ 371 (c)(1),
(2) Date: Jan. 8, 2022

(87) PCT Pub. No.: WO2021/010474
PCT Pub. Date: Jan. 21, 2021

(65) Prior Publication Data
US 2022/0267217 A1    Aug. 25, 2022

(30) Foreign Application Priority Data

Jul. 18, 2019 (JP) .............................. JP2019-133025

(51) Int. Cl.
*C04B 35/5831* (2006.01)
(52) U.S. Cl.
CPC .... *C04B 35/5831* (2013.01); *C04B 2235/781* (2013.01)

(58) Field of Classification Search
CPC .................................................. C04B 35/5831
See application file for complete search history.

(56) References Cited

U.S. PATENT DOCUMENTS

| 7,902,098 B2 | 3/2011 | Noda et al. |
| 2008/0286558 A1 | 11/2008 | Kukino et al. |

(Continued)

FOREIGN PATENT DOCUMENTS

| CN | 107001155 A | 8/2017 |
| EP | 1870185 A1 | 12/2007 |

(Continued)

OTHER PUBLICATIONS

Copending U.S. Appl. No. 17/625,749 (National Stage of PCT/JP2020/027900), entitled "Cubic Boron Nitride Sintered Material and Method of Producing Same", filed concurrently herewith.

(Continued)

*Primary Examiner* — Karl E Group
(74) *Attorney, Agent, or Firm* — Renner, Otto, Boisselle & Sklar, LLP

(57) ABSTRACT

A cubic boron nitride sintered material includes: more than or equal to 50 volume % and less than 80 volume % of cubic boron nitride grains; and more than 20 volume % and less than or equal to 50 volume % of a binder phase, and when an oxygen content is measured in a direction perpendicular to an interface between cubic boron nitride grains using TEM-EDX, a first region having an oxygen content larger than an average value of an oxygen content of a cubic boron nitride grain exists, the interface exists in the first region, and a length of the first region along the direction perpendicular to the interface is more than or equal to 0.1 nm and less than or equal to 10 nm.

5 Claims, 7 Drawing Sheets

(56) References Cited

U.S. PATENT DOCUMENTS

| | | |
|---|---|---|
| 2009/0120011 A1 | 5/2009 | Okamura et al. |
| 2009/0169840 A1 | 7/2009 | Okamura et al. |
| 2014/0315015 A1 | 10/2014 | Fukushima |
| 2016/0068449 A1 | 3/2016 | Tsukihara et al. |
| 2017/0341155 A1 | 11/2017 | Yano et al. |
| 2021/0246078 A1 | 8/2021 | Okamura |
| 2021/0246536 A1* | 8/2021 | Okamura ................ C22C 29/16 |
| 2022/0204411 A1* | 6/2022 | Hama ................ C04B 35/5831 |

FOREIGN PATENT DOCUMENTS

| | | | |
|---|---|---|---|
| JP | 61-141672 | A | 6/1986 |
| JP | H11-268956 | A | 10/1999 |
| JP | 2006-169080 | A | 6/2006 |
| JP | 2007-70148 | A | 3/2007 |
| JP | 2013-234237 | A | 11/2013 |
| JP | 2014-214065 | A | 11/2014 |
| JP | 2019-65513 | A | 4/2019 |
| JP | 6744519 | B1 | 8/2020 |
| KR | 10-2008-0069508 | A | 7/2008 |
| WO | 2007/145071 | A1 | 12/2007 |

OTHER PUBLICATIONS

Office Action dated Jun. 10, 2022 in corresponding U.S. Appl. No. 17/625,749.

Non-Final Office Action dated Aug. 15, 2022, for co-pending U.S. Appl. No. 17/625,749.

Notice of Allowance dated Dec. 7, 2022, for co-pending U.S. Appl. No. 17/625,749.

* cited by examiner

CUBIC BORON NITRIDE SINTERED MATERIAL

TECHNICAL FIELD

The present disclosure relates to a cubic boron nitride sintered material. The present application claims a priority based on Japanese Patent Application No. 2019-133025 filed on Jul. 18, 2019, the entire content of which is incorporated herein by reference.

BACKGROUND ART

A cubic boron nitride sintered material (hereinafter, also referred to as "cBN sintered material") is a high-hardness material used for cutting tools and the like. The cBN sintered material is normally constituted of cubic boron nitride grains (hereinafter, also referred to as "cBN grains") and a binder phase. Depending on a content ratio of the cBN grains, characteristics of the cBN sintered material tend to differ.

Hence, in the field of cutting, different types of cBN sintered materials are applied to cutting tools in accordance with the material of a workpiece, required precision in processing, or the like. For example, a cubic boron nitride sintered material (hereinafter, also referred to as a "low-cBN sintered material") having a low content ratio of cubic boron nitride (hereinafter, also referred to as "cBN") can be suitably used for cutting of a hardened steel or the like.

For example, Japanese Patent Laying-Open No. 11-268956 (PTL 1) discloses a cutting insert composed of a cubic boron nitride-based ultra-high pressure sintered material having a composition including 30 to 70 area % of cubic boron nitride in a structure observation with an electron microscope.

CITATION LIST

Patent Literature

PTL 1: Japanese Patent Laying-Open No. 11-268956

SUMMARY OF INVENTION

A cubic boron nitride sintered material according to the present disclosure is a cubic boron nitride sintered material including: more than or equal to 50 volume % and less than 80 volume % of cubic boron nitride grains; and more than 20 volume % and less than or equal to 50 volume % of a binder phase, wherein the binder phase includes at least one selected from a group consisting of a compound composed of at least one element selected from a group consisting of a group 4 element, a group 5 element, a group 6 element in a periodic table, and aluminum, and at least one element selected from a group consisting of nitrogen, carbon, boron, and oxygen, and a solid solution originated from the compound, and when an oxygen content is measured in a direction perpendicular to an interface between cubic boron nitride grains using TEM-EDX, a first region having an oxygen content larger than an average value of an oxygen content of a cubic boron nitride grain exists, the interface exists in the first region, and a length of the first region along the direction perpendicular to the interface is more than or equal to 0.1 nm and less than or equal to 10 nm.

DETAILED DESCRIPTION

Figure 1:
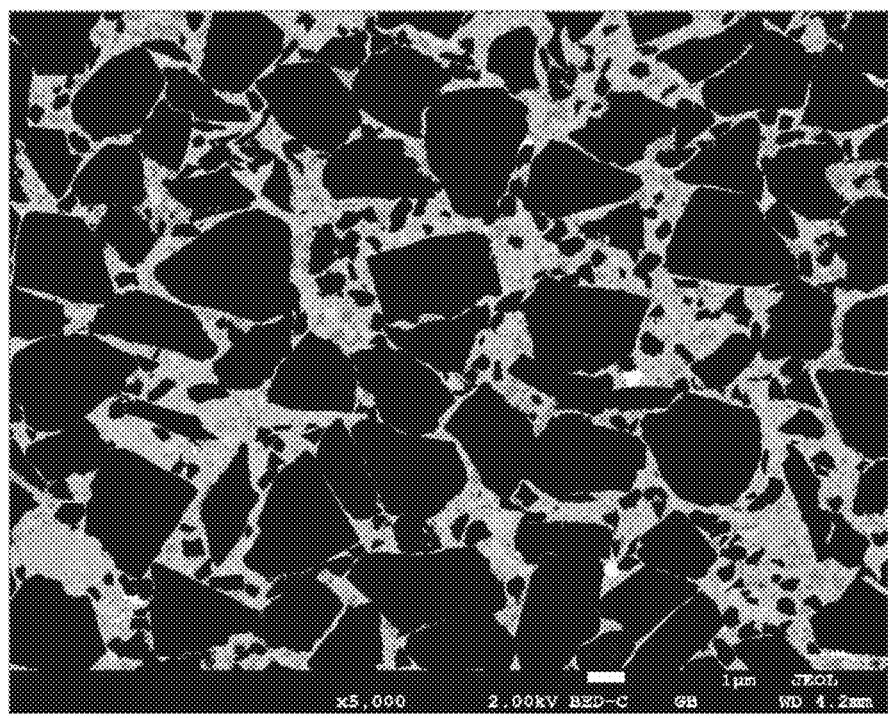
FIG. 1 shows an image showing an exemplary reflected electron image obtained by observing a cBN sintered material according to the present disclosure using a SEM.

Problems to be Solved by the Present Disclosure

In recent years, due to rapid improvement in functions of mechanical parts, it becomes more difficult to cut workpieces to serve as the mechanical parts. This leads to a short life of a cutting tool, thus apparently resulting in increased cost, disadvantageously. Therefore, further improvement of a low-cBN sintered material has been desired.

It is an object of the present disclosure to provide a cubic boron nitride sintered material that can attain a long life of a tool when used as a tool material.

Advantageous Effect of the Present Disclosure

The cubic boron nitride sintered material according to the present disclosure can attain a long life of a tool when used as a tool material.

Description of Embodiments

First, embodiments of the present disclosure are listed and described.

(1) A cubic boron nitride sintered material according to the present disclosure is a cubic boron nitride sintered material including: more than or equal to 50 volume % and less than 80 volume % of cubic boron nitride grains; and more than 20 volume % and less than or equal to 50 volume % of a binder phase, wherein the binder phase includes at least one selected from a group consisting of a compound composed of at least one element selected from a group consisting of a group 4 element, a group 5 element, a group 6 element in a periodic table, and aluminum, and at least one element selected from a group consisting of nitrogen, carbon, boron, and oxygen, and a solid solution originated from the compound, and when an oxygen content is measured in a direction perpendicular to an interface between cubic boron nitride grains using TEM-EDX, a first region having an oxygen content larger than an average value of an oxygen content of a cubic boron nitride grain exists, the interface exists in the first region, and a length of the first region along the direction perpendicular to the interface is more than or equal to 0.1 nm and less than or equal to 10 nm.

When the cubic boron nitride sintered material according to the present disclosure is used as a tool material, a long life of the tool can be attained.

(2) A content ratio of the cubic boron nitride grains is preferably more than or equal to 55 volume % and less than or equal to 75 volume %. Thus, when the cubic boron nitride sintered material is used as a tool material, a longer life of the tool can be attained.

(3) The length of the first region along the direction perpendicular to the interface is preferably more than or equal to 0.1 nm and less than or equal to 5 nm. Thus, when the cubic boron nitride sintered material is used as a tool material, a longer life of the tool can be attained.

(4) A difference between a maximum value of the oxygen content of the first region and the average value of the oxygen content of the cubic boron nitride grain is preferably more than or equal to 0.1 atomic % and less than or equal to 5 atomic %. Thus, when the cubic boron nitride sintered material is used as a tool material, a longer life of the tool can be attained.

(5) The difference between the maximum value of the oxygen content of the first region and the average value of the oxygen content of the cubic boron nitride grain is more than or equal to 0.1 atomic % and less than or equal to 3 atomic %. Thus, when the cubic boron nitride sintered material is used as a tool material, a longer life of the tool can be attained.

Details of Embodiments of the Present Disclosure

In order to complete a cBN sintered material that attains a longer life, the present inventors first used, as a source material for a binder phase in a low-cBN sintered material, a binder powder including at least one selected from a group consisting of a compound composed of at least one element selected from a group consisting of a group 4 element, a group 5 element, a group 6 element in a periodic table, and aluminum, and at least one element selected from a group consisting of nitrogen, carbon, boron, and oxygen, and a solid solution originated from the compound. This is because the present inventors have obtained the following finding in previous research: when such a binder powder is used, the binder phase has a particularly high binding strength with respect to cBN grains, with the result that an excellent cBN sintered material can be obtained.

In order to utilize high mechanical strength of cBN in a low-cBN sintered material having a small content of cBN grains, the present inventors considered it important to further increase the binding strength between the cBN grains, and had conducted a study therefor. As a result, the following findings (a) to (e) and considerations were obtained.

(a) Oxygen exists on surfaces of particles of a cBN powder serving as a source material for the cBN sintered material, and the oxygen exists in an amorphous state with $B_2O_3$ or boron (B) being mixed therewith. When the cBN sintered material is produced using such a cBN powder, a large amount of oxygen remains in the cBN sintered material.

(b) When the cBN powder and a binder powder are mixed and ultra-high pressure sintering is performed, the binder powder (for example, ceramic powder), which has low hardness, is first crushed, and the cBN powder, which has high toughness and high hardness, is less likely to be crushed. Therefore, in the course of sintering, the cBN particles are brought into contact with each other, thus resulting in solid phase sintering. In the cBN sintered material, a solid-phase sintered portion has weaker binding strength than that of the binder phase, and therefore is likely to become a starting point of fracture.

(c) It is considered that the oxygen existing on the surfaces of the particles of the cBN powder serves to decrease the binding strength between the cBN grains. Therefore, it is considered that the binding strength between the cBN grains can be increased by reducing an amount of the oxygen.

(d) In the cBN sintered material, boron (B) and/or nitrogen (N) existing on the surfaces of the cBN grains react with the binder and is bound thereto, thereby binding the cBN grains and the binder phase.

(e) It is considered that the oxygen existing on the surfaces of the particles of the cBN powder serves to decrease the binding strength between the cBN grain and the binder phase. Therefore, it is considered that the binding strength between the cBN grain and the binder phase can be increased by reducing the amount of the oxygen.

Based on the above findings and considerations, the present inventors completed the present disclosure as a result of diligent study. Hereinafter, specific examples of a cubic boron nitride sintered material according to the present disclosure and a method of producing the cubic boron nitride sintered material will be described with reference to the figures. In the figures of the present disclosure, the same reference characters indicate the same or corresponding portions. Further, a relation of such a dimension as a length, a width, a thickness, or a depth is modified as appropriate for clarity and brevity of the figures and does not necessarily represent an actual dimensional relation.

In the present specification, the expression "A to B" represents a range of lower to upper limits (i.e., more than or equal to A and less than or equal to B). When no unit is indicated for A and a unit is indicated only for B, the unit of A is the same as the unit of B.

When a compound or the like is expressed by a chemical formula in the present specification and an atomic ratio is not particularly limited, it is assumed that all the conventionally known atomic ratios are included. The atomic ratio should not be necessarily limited only to one in the stoichiometric range. For example, when "TiAlN" is described, an atomic ratio in the TiAlN is not limited to Ti:Al:N=0.5:0.5:1, and include all the conventionally known atomic ratios. The same also applies to compounds other than the "TiAlN". In the present embodiment, a metallic element and a nonmetallic element does not necessarily need to constitute a stoichiometric composition. Examples of the metallic element include titanium (Ti), aluminum (Al), silicon (Si), tantalum (Ta), or chromium (Cr). Examples of the nonmetallic element include nitrogen (N), oxygen (O), and carbon (C).

First Embodiment: Cubic Boron Nitride Sintered Material

A cubic boron nitride sintered material according to the present disclosure is a cubic boron nitride sintered material comprising: more than or equal to 50 volume % and less than 80 volume % of cubic boron nitride grains; and more than 20 volume % and less than or equal to 50 volume % of a binder phase, wherein the binder phase includes at least one selected from a group consisting of a compound composed of at least one element selected from a group consisting of a group 4 element, a group 5 element, a group 6 element in a periodic table, and aluminum, and at least one element selected from a group consisting of nitrogen, carbon, boron, and oxygen, and a solid solution originated from the compound, and when an oxygen content is measured in a direction perpendicular to an interface between cubic boron nitride grains using TEM-EDX, a first region having an oxygen content larger than an average value of an oxygen content of a cubic boron nitride grain exists, the interface exists in the first region, and a length of the first region along the direction perpendicular to the interface is more than or equal to 0.1 nm and less than or equal to 10 nm.

The cubic boron nitride sintered material according to the present disclosure includes: more than or equal to 50 volume % and less than 80 volume % of the cubic boron nitride grains; and more than 20 volume % and less than or equal to 50 volume % of the binder phase. That is, the cubic boron nitride sintered material according to the present disclosure is a so-called low-cBN sintered material. It should be noted that the cBN sintered material can include an inevitable impurity resulting from a source material, a manufacturing condition, or the like. In the cubic boron nitride sintered material according to the present disclosure, the total of the content ratio of the cBN grains, the content ratio of the binder phase, and the content ratio of the inevitable impurity is 100 volume %.

In the cubic boron nitride sintered material according to the present disclosure, the lower limit of the total of the content ratio of the cBN grains and the content ratio of the binder phase can be more than or equal to 95 volume %, can be more than or equal to 96 volume %, can be more than or equal to 97 volume %, can be more than or equal to 98 volume %, or can be more than or equal to 99 volume %. In the cubic boron nitride sintered material according to the present disclosure, the upper limit of the total of the content ratio of the cBN grains and the content ratio of the binder phase can be less than or equal to 100 volume %, or can be less than 100 volume %. In the cubic boron nitride sintered material according to the present disclosure, the total of the content ratio of the cBN grains and the content ratio of the binder phase can be more than or equal to 95 volume % and less than or equal to 100 volume %, can be more than or equal to 96 volume % and less than or equal to 100 volume %, can be more than or equal to 97 volume % and less than or equal to 100 volume %, can be more than or equal to 98 volume % and less than or equal to 100 volume %, can be more than or equal to 99 volume % and less than or equal to 100 volume %, can be more than or equal to 95 volume % and less than 100 volume %, can be more than or equal to 96 volume % and less than 100 volume %, can be more than or equal to 97 volume % and less than 100 volume %, can be more than or equal to 98 volume % and less than 100 volume %, or can be more than or equal to 99 volume % and less than 100 volume %.

The content ratio (volume %) of the cBN grains and the content ratio (volume %) of the binder phase in the cBN sintered material can be checked by performing structure observation, elemental analysis, and the like onto the cBN sintered material using an energy dispersive X-ray analysis device (EDX) ("Octane Elect EDS system" (trade name) provided by AMETEK) accompanied with a scanning electron microscope (SEM) ("JSM-7800F" (trade name) provided by JEOL).

A method of measuring the content ratio (volume %) of the cBN grains is as follows. First, the cBN sintered material is cut at an arbitrary location to produce a specimen including a cross section of the cBN sintered material. For the formation of the cross section, a focused ion beam device, a cross section polisher device, or the like can be used. Next, the cross section is observed by the SEM at a magnification of 5000× to obtain a reflected electron image. In the reflected electron image, a black region represents a region in which the cBN grains exist and a gray or white region represents a region in which the binder phase exists.

Next, the reflected electron image is subjected to binarization processing using image analysis software ("WinROOF" provided by Mitani Corporation). From the image having been through the binarization processing, the area ratio of pixels originated from dark fields (pixels originated from the cBN grains) in the area of the measurement visual field is calculated. The calculated area ratio is regarded as volume %, thereby finding the content ratio (volume %) of the cBN grains.

From the image having been through the binarization processing, the area ratio of pixels originated from bright fields (pixels originated from the binder phase) in the area of the measurement visual field is calculated, thereby finding the content ratio (volume %) of the binder phase.

A specific method for the binarization processing will be described with reference to FIGS. 1 to 6.

Figure 2:
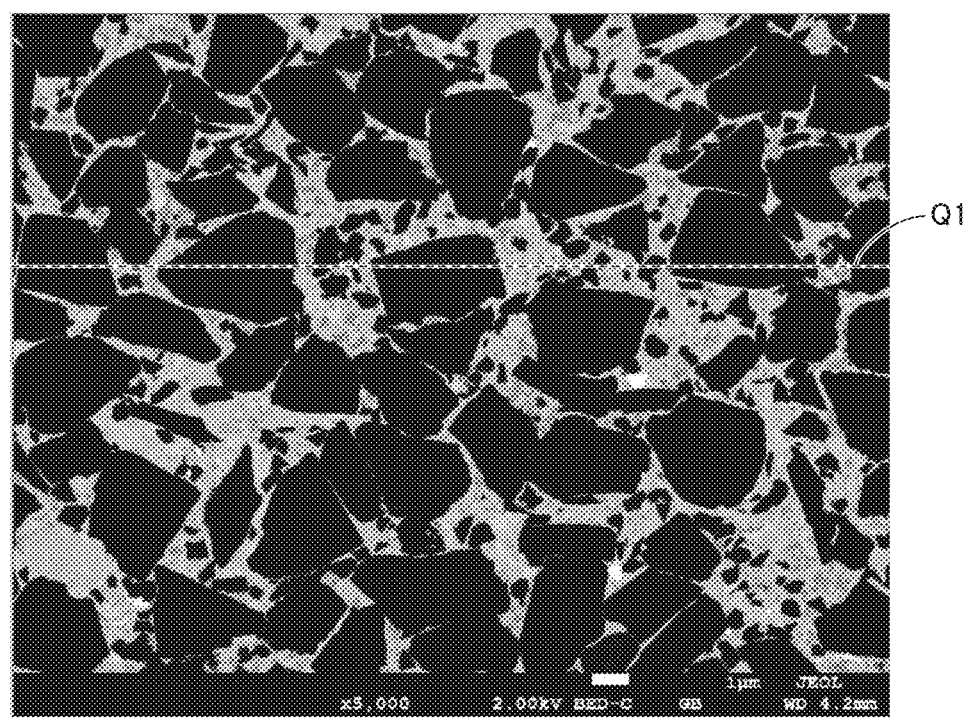
FIG. 2 shows an image obtained by loading the reflected electron image of FIG. 1 into image processing software.

FIG. 1 shows an exemplary reflected electron image obtained by observing the cBN sintered material using a SEM. The reflected electron image is loaded into image processing software. The loaded image is shown in FIG. 2. As shown in FIG. 2, an arbitrary line Q1 is drawn in the loaded image.

Figure 3:
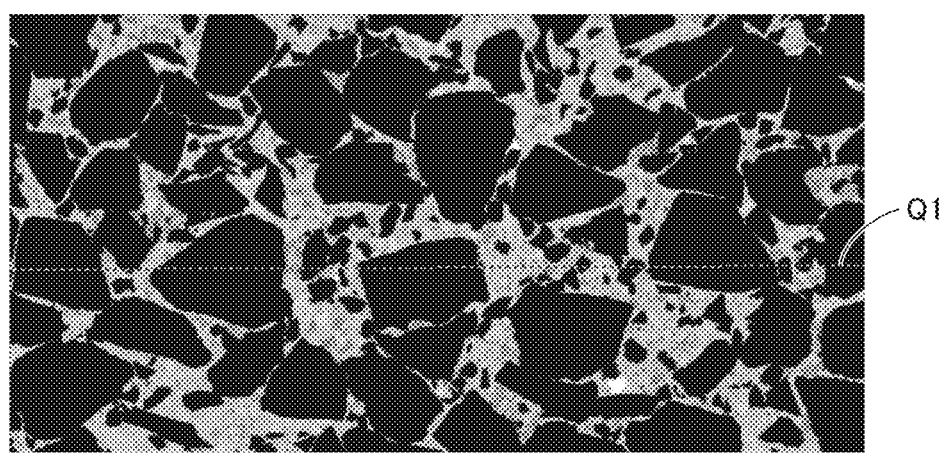
FIG. 3 shows an upper image that is the reflected electron image, and shows a lower image that is a concentration cross section graph obtained from the reflected electron image.
Figure 3:
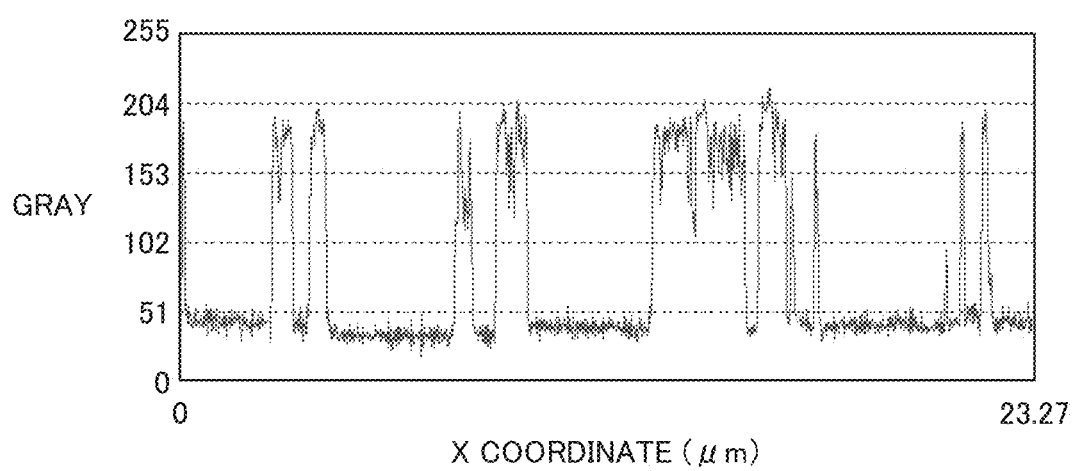
Figure 4:
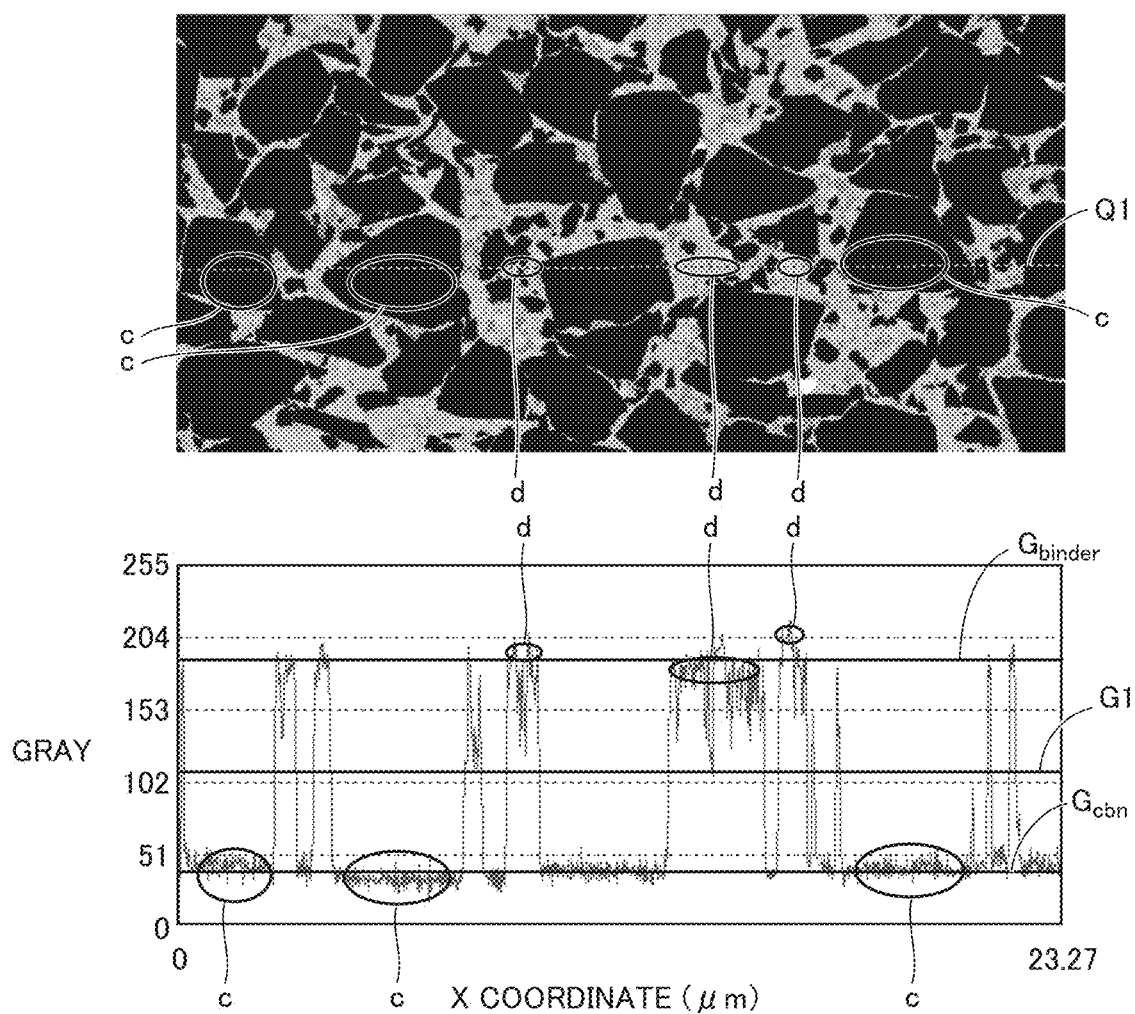
FIG. 4 is a diagram for illustrating a method of defining a black region and a binder phase.
Figure 5:
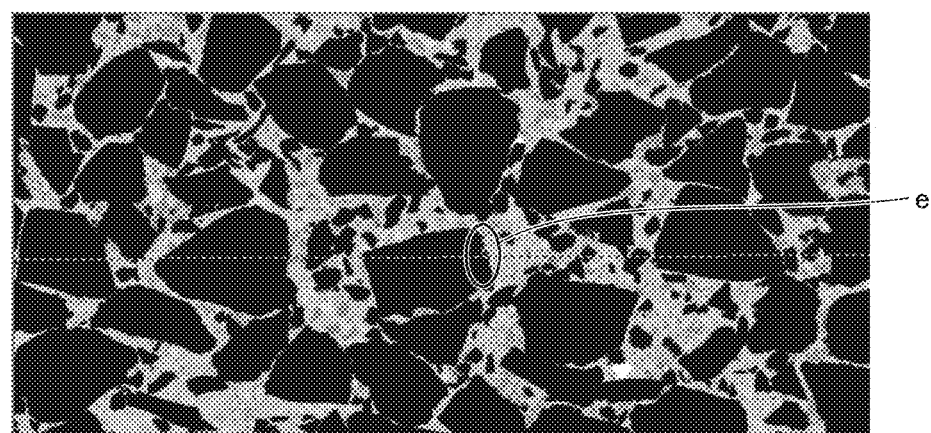
FIG. 5 is a diagram for illustrating a boundary between the black region and the binder phase.
Figure 5:
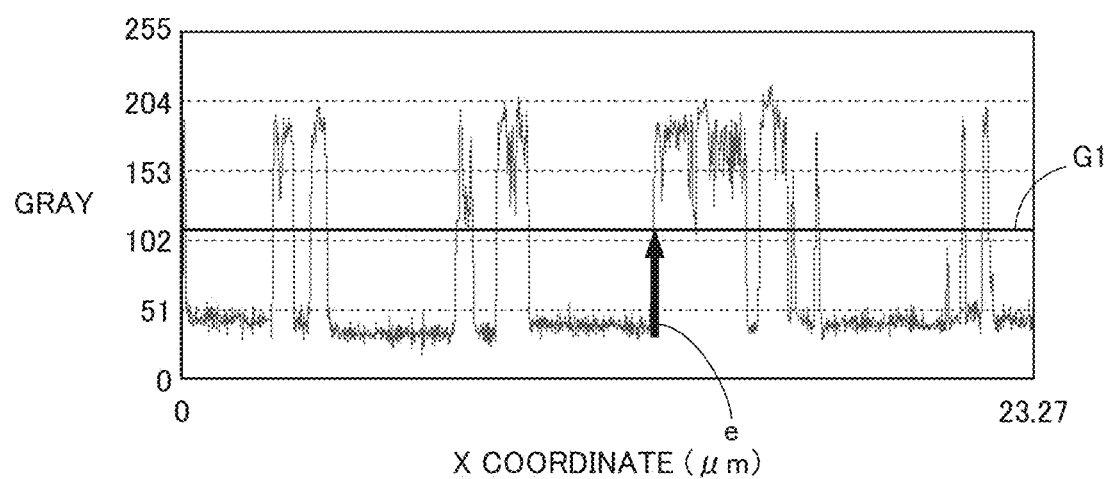

A concentration is measured along line Q1 in the cross sectional view, and a GRAY value is read. A graph (hereinafter, also referred to as a "concentration cross section graph") is prepared with the X coordinate representing line Q1 and the Y coordinate representing the GRAY value. FIG. 3 shows the reflected electron image of the cBN sintered material and the concentration cross section graph of the reflected electron image (the upper image corresponds to the reflected electron image and the lower graph corresponds to the concentration cross section graph). In FIG. 3, the width of the reflected electron image coincides with the width (23.27 μm) of the X coordinate of the concentration cross section graph. Hence, a distance from the left end portion of line Q1 to a specific position on line Q1 in the reflected electron image is represented by a value of the X coordinate in the concentration cross section graph.

In the reflected electron image of FIG. 3, a black region in which the cBN grains exist is arbitrarily selected at three locations. The black region corresponds to, for example, portions indicated by ellipses each denoted by a reference character "c" in the reflected electron image of FIG. 4.

The GRAY values of the black region at the three locations are read from the concentration cross section graph. The GRAY value of the black region at each of the three locations is the average value of the GRAY values of portions at a corresponding one of the three locations surrounded by the ellipses denoted by reference character "c" in the concentration cross section graph of FIG. 4. The average value of the GRAY values at each of the three locations is calculated. This average value is defined as "cBN GRAY value" (hereinafter, also referred to as "$G_{cbn}$").

In the reflected electron image of FIG. 3, a region in which the binder phase indicated by a gray color exists is arbitrarily selected at three locations. The binder phase corresponds to, for example, portions indicated by ellipses denoted by a reference character "d" in the reflected electron image of FIG. 4.

The GRAY values of the binder phase at the three locations are read from the concentration cross section graph. The GRAY value of the binder phase at each of the three locations is the average value of the GRAY values of portions at a corresponding one of the three locations surrounded by the ellipses denoted by reference character "d" in the concentration cross section graph of FIG. 4. The average value of the GRAY values at each of the three locations is calculated. This average value is defined as "binder phase GRAY value" (hereinafter, also referred to as "$G_{binder}$").

A GRAY value indicated by $(G_{cbn}+G_{binder})/2$ is defined as the GRAY value of the interface between the black region (cBN grain) and the binder phase. For example, in the concentration cross section graph of FIG. 4, GRAY value $G_{cbn}$ of the black region (cBN grain) is indicated by a line $G_{cbn}$, GRAY value $G_{binder}$ of the binder phase is indicated by a line $G_{binder}$, and the GRAY value indicated by $(G_{cbn}+G_{binder})/2$ is indicated by a line G1.

By defining the interface between the black region (cBN grain) and the binder phase in the concentration cross section graph as described above, the values of the X coordinate and the Y coordinate at the interface between the black region (cBN grain) and the binder phase can be read. The interface can be arbitrarily defined. For example, in a reflected electron image at the upper part of FIG. 5, a portion surrounded by an ellipse denoted by a reference character "e" is shown as an exemplary portion including the interface. In the reflected electron image of FIG. 5, the interface between the black region (cBN grain) and the binder phase is, for example, the portion indicated by the ellipse denoted by reference character "e". In a concentration cross section graph at the lower part of FIG. 5, the interface, which corresponds to the ellipse denoted by the reference character "e", between the black region (cBN grain) and the binder phase is a portion indicated by an arrow e. The tip of arrow e indicates the position of an intersection point between the concentration cross section graph of the GRAY value and line G1 indicating the GRAY value $(G_{cbn}+G_{binder})/2$. The values of the X coordinate of arrow e and the Y coordinate of the tip of arrow e correspond to the values of the X coordinate and the Y coordinate at the interface between the black region (cBN grain) and the binder phase.

Figure 6:
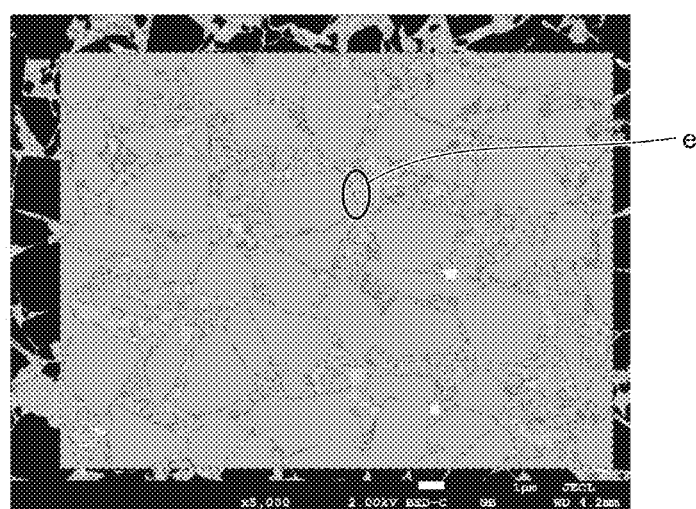
FIG. 6 shows an image obtained by performing binarization processing onto the reflected electron image of FIG. 1.

The binarization processing is performed using, as threshold values, the values of the X coordinate and the Y coordinate at the interface between the black region (cBN grain) and the binder phase. FIG. 6 shows an image having been through the binarization processing. In FIG. 6, a region surrounded by a dotted line is a region having been through the binarization processing. It should be noted that the image having been through the binarization processing may include not only bright fields and dark fields but also white regions (portions whiter than the bright fields) corresponding to the regions white in the image yet to be through the binarization processing.

In FIG. 6, the area ratio of pixels originated from the dark fields (pixels originated from the cBN grains) in the area of the measurement visual field is calculated. The calculated area ratio is regarded as volume %, thereby finding the content ratio (volume %) of the cBN grains.

In FIG. 6, the area ratio of pixels originated from the bright fields (pixels originated from the binder phase) in the area of the measurement visual field is calculated, thereby finding the content ratio (volume %) of the binder phase.

The content ratio of the cBN grains in the cBN sintered material is preferably more than or equal to 55 volume % and less than or equal to 75 volume %, is more preferably more than or equal to 65 volume % and less than or equal to 75 volume %, and is further preferably more than or equal to 70 volume % and less than or equal to 75 volume %.

The content ratio of the binder phase in the cBN sintered material is preferably more than or equal to 25 volume % and less than or equal to 45 volume %, is more preferably more than or equal to 25 volume % and less than or equal to 35 volume %, and is further preferably more than or equal to 25 volume % and less than or equal to 30 volume %.

<<cBN Grains>>

The cBN grains have high hardness, high strength, and high toughness, and serve as a base of the cBN sintered material. $D_{50}$ (average grain size) of the cBN grains is not particularly limited, and can be 0.1 to 10.0 μm, for example. Normally, as $D_{50}$ is smaller, the hardness of the cBN sintered material tends to be higher, and as variation in the grain sizes is smaller, the characteristics of the cBN sintered material tend to be more uniform. $D_{50}$ of the cBN grains is preferably, for example, 0.5 to 4.0 μm.

$D_{50}$ of the cBN grains is determined as follows. First, a specimen including a cross section of the cBN sintered material is formed in the same manner as in the above-described method of finding the content ratio of the cBN grains, and a reflected electron image is obtained. Next, the equivalent circle diameter of each dark field (corresponding to the cBN grain) in the reflected electron image is calculated using image analysis software. It is preferable to calculate the equivalent circle diameters of 100 or more cBN grains by performing observation in five or more visual fields.

Next, the equivalent circle diameters are arranged in an ascending order from the minimum value to the maximum value to find a cumulative distribution. $D_{50}$ represents a grain size corresponding to a cumulative area of 50% in the cumulative distribution. It should be noted that the equivalent circle diameter refers to the diameter of a circle having the same area as the area of the measured cBN grain.

<<Binder Phase>>

The binder phase serves to allow the cBN grains, each of which is a material difficult to be sintered, to be sintered at industrial levels of pressure and temperature. Moreover, reactivity of the binder phase with respect to iron is lower than that of cBN. Hence, in cutting of a high-hardness hardened steel, the binder phase additionally works to suppress chemical wear and thermal wear. Moreover, when the cBN sintered material contains the binder phase, wear resistance in high-efficient processing of a high-hardness hardened steel is improved.

In the cBN sintered material according to the present disclosure, the binder phase includes at least one selected from a group consisting of a compound (hereinafter, also referred to as "binder phase compound") composed of at least one element selected from a group consisting of a group 4 element, a group 5 element, a group 6 element in a periodic table, and aluminum, and at least one element selected from a group consisting of nitrogen, carbon, boron, and oxygen, and a solid solution originated from the binder phase compound.

Here, the group 4 element in the periodic table includes titanium (Ti), zirconium (Zr), and hafnium (Hf), for example. The group 5 element includes vanadium (V), niobium (Nb), and tantalum (Ta), for example. The group 6 element includes chromium (Cr), molybdenum (Mo), and tungsten (W), for example. Hereinafter, each of the elements included in the group 4 element, the group 5 element, and the group 6 element will be also referred to as "first metal element".

Examples of the compound (nitride) including the first metal element(s) and nitrogen include titanium nitride (TiN), zirconium nitride (ZrN), hafnium nitride (HfN), vanadium nitride (VN), niobium nitride (NbN), tantalum nitride (TaN), chromium nitride ($Cr_2N$), molybdenum nitride (MoN), tungsten nitride (WN), titanium zirconium nitride (TiZrN), titanium hafnium nitride (TiHfN), titanium vanadium nitride (TiVN), titanium niobium nitride (TiNbN), titanium tantalum nitride (TiTaN), titanium chromium nitride (TiCrN), titanium molybdenum nitride (TiMoN), titanium tungsten nitride (TiWN), zirconium hafnium nitride (ZrHfN), zirconium vanadium nitride (ZrVN), zirconium niobium nitride (ZrNbN), zirconium tantalum nitride (ZrTaN), zirconium chromium nitride (ZrCrN), zirconium molybdenum nitride (ZrMoN), zirconium tungsten nitride (ZrWN), hafnium vanadium nitride (HfVN), hafnium niobium nitride (HfNbN), hafnium tantalum nitride (HffaN), hafnium chromium nitride (HfCrN), hafnium molybdenum nitride (HfMoN), hafnium tungsten nitride (HEWN), vanadium niobium nitride (VNbN), vanadium tantalum nitride (VTaN), vanadium chromium nitride (VCrN), vanadium molybdenum nitride (VMoN), vanadium tungsten nitride (VWN), niobium tantalum nitride (NbTaN), niobium chromium nitride (NbCrN), niobium molybdenum nitride (NbMoN), niobium tungsten nitride (NbWN), tantalum chromium nitride (TaCrN), tantalum molybdenum nitride (TaMoN), tantalum tungsten nitride (TaWN), chromium molybdenum nitride (CrMoN), chromium tungsten nitride (CrWN), and molybdenum tungsten nitride (MoWN).

Examples of the compound (carbide) including the first metal element(s) and carbon include titanium carbide (TiC), zirconium carbide (ZrC), hafnium carbide (HfC), vanadium carbide (VC), niobium carbide (NbC), tantalum carbide (TaC), chromium carbide ($Cr_3C_2$), molybdenum carbide (MoC), and tungsten carbide (WC).

Examples of the compound (boride) including the first metal element(s) and boron include titanium boride ($TiB_2$), zirconium boride ($ZrB_2$), hafnium boride ($HfB_2$), vanadium boride ($VB_2$), niobium boride ($NbB_2$), tantalum boride ($TaB_2$), chromium boride (CrB), molybdenum boride (MoB), and tungsten boride (WB).

Examples of the compound (oxide) including the first metal element(s) and oxygen include titanium oxide ($TiO_2$), zirconium oxide ($ZrO_2$), hafnium oxide ($HfO_2$), vanadium oxide ($V_2O_5$), niobium oxide ($Nb_2O_5$), tantalum oxide ($Ta_2O_5$), chromium oxide ($Cr_2O_3$), molybdenum oxide ($MoO_3$), and tungsten oxide ($WO_3$).

Examples of the compound (carbonitride) including the first metal element(s), carbon, and nitrogen include titanium carbonitride (TiCN), zirconium carbonitride (ZrCN), and hafnium carbonitride (HfCN).

Examples of the compound (oxynitride) composed of the first metal element(s), oxygen, and nitrogen include titanium oxynitride (TiON), zirconium oxynitride (ZrON), hafnium oxynitride (HfON), vanadium oxynitride (VON), niobium oxynitride (NbON), tantalum oxynitride (TaON), chromium oxynitride (CrON), molybdenum oxynitride (MoON), and tungsten oxynitride (WON).

Examples of the binder phase compound including aluminum include aluminum nitride (AlN), titanium aluminum nitride (TiAlN, $Ti_2AlN$, or $Ti_3AlN$), aluminum boride ($AlB_2$), and aluminum oxide ($Al_2O_3$).

The solid solution originated from the binder phase compound refers to a state in which two or more of the compounds illustrated above are dissolved in the crystal structures of the compounds, and refers to an interstitial solid solution or a substitutional solid solution.

One of the binder phase compounds may be solely used or two or more of the binder phase compounds may be used in combination.

The binder phase may include other component(s) in addition to the binder phase compound(s). Examples of element(s) of the other component(s) include nickel (Ni), iron (Fe), manganese (Mn) and rhenium (Re).

The composition of the binder phase included in the cBN sintered material can be specified by, for example, XRD (X-ray Diffraction) and EDX (Energy dispersive X-ray spectrometry).

<<Analysis with TEM-EDX>>

A feature of the cBN sintered material according to the present disclosure lies in that the following conditions (1) to (3) are satisfied when an oxygen content is measured in a direction perpendicular to an interface between cBN grains using TEM-EDX (Energy Dispersion X-ray Spectroscopy (EDX) accompanied with Transmission Electron Microscope (TEM)).

(1) A first region having an oxygen content larger than an average value of an oxygen content of a cBN grain exists.

(2) The interface exists in the first region.

(3) The length of the first region along the direction perpendicular to the interface is more than or equal to 0.1 nm and less than or equal to 10 nm.

An analysis with the TEM-EDX is performed as follows. First, a sample is obtained from the cBN sintered material, and an argon ion slicer is used to slice the sample to form a cut piece having a thickness of 30 to 100 nm. Then, the cut piece is observed at 50000× using TEM (transmission electron microscope; "JEM-2100Γ/Cs" (trade name) provided by JEOL), thereby obtaining a first image.

In the first image, the interface between the cBN grains is arbitrarily selected. It should be noted that in the first image, the cBN grain is observed as a black region, the binder phase is observed as a white or gray region, and the interface is observed as a white or gray region.

Next, the selected interface is positioned to pass through the vicinity of the center of the image, and observation is performed at an observation magnification changed to 2000000×, thereby obtaining a second image. In the obtained second image (100 nm×100 nm), the interface exists to extend from one end of the image to the other one end of the image opposite to the foregoing one end, via the vicinity of the center of the image.

Next, an element mapping analysis with EDX is performed onto the second image to analyze a distribution of oxygen.

When a region including the interface and having a high oxygen concentration along the interface is observed as a result of the element mapping analysis, the oxygen content is measured in the direction perpendicular to the interface in the second image. A specific measurement method is as follows.

First, in the second image, an extension direction in which the interface extends (extension direction in which the region having a high oxygen concentration extends) is confirmed, and then an element line analysis is performed in the direction perpendicular to the extension direction. Here, the direction perpendicular to the extension direction of the interface refers to a direction along a straight line intersecting a tangent of the extension direction at an angle of 90°±5°. A beam diameter on that occasion is less than or equal to 0.3 nm, and a scanning interval is 0.1 to 0.7 nm.

The average value of the oxygen content of the cBN grain and the length of the first region having an oxygen content larger than the average value along the direction perpendicular to the interface are calculated in accordance with the results of the element line analysis. A specific calculation method will be described with reference to FIGS. 7 and 8.

Figure 7:
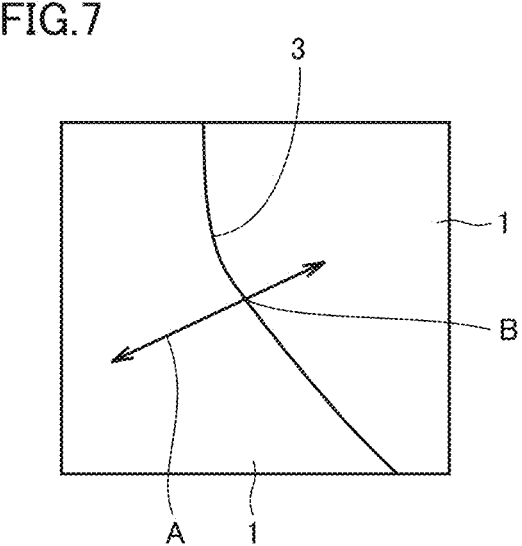
FIG. 7 is a diagram schematically showing an exemplary second image.

FIG. 7 is a diagram schematically showing an exemplary second image. In FIG. 7, cubic boron nitride grains 1 are adjacent to each other to form an interface 3. The element line analysis is performed along a direction perpendicular to the extension direction of interface 3 (direction along the straight line intersecting the tangent of the extension direction at an angle of 90°±5°) (direction indicated by an arrow A in FIG. 7). Further, the direction perpendicular to the extension direction of the interface is a direction that is perpendicular to the interface (boundary line) between the cBN grains in the cross section of the sample and that is parallel to the cross section.

Figure 8:
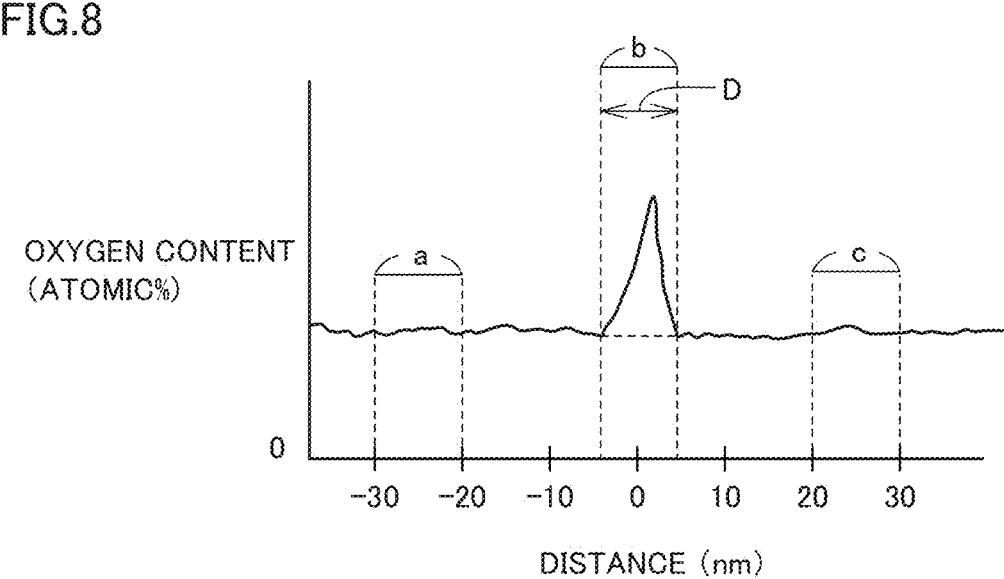
FIG. 8 is an exemplary graph showing a result of element line analysis.

FIG. 8 is an exemplary graph showing the result of the element line analysis. In the graph, the horizontal axis (X axis) represents a distance (nm) from the interface, and the vertical axis (Y axis) represents an oxygen content (atomic %). It should be noted that "X=0" on the horizontal axis (X axis) represents the interface, and when the value of the horizontal axis (X axis) is indicated with "−" (minus), the absolute value thereof corresponds to the distance from the interface.

For example, an intersection point B between interface 3 and the direction (arrow A) of the element line analysis in FIG. 7 has a distance of 0 from interface 3. Therefore, intersection point B corresponds to X=0 in the graph of FIG. 8, and the value of the vertical axis (Y axis) at X=0 corresponds to an oxygen content at intersection point B.

A distance from intersection point B in FIG. 7 toward the right side along the direction (arrow A) of the element line analysis is indicated as a positive numerical value of the horizontal axis (X axis) in the graph in FIG. 8. On the other hand, a distance from intersection point B in FIG. 7 toward the left side along the direction (arrow A) of the element line analysis is indicated as a negative numerical value of the horizontal axis (X axis) in the graph in FIG. 8.

In the present specification, the average value of the oxygen content of the cBN grain refers to the average value of the oxygen content of the cBN grain in a region between a line L1 and a line L2 in the cross section of the cBN sintered material, line L1 being an imaginary line located at a distance of 20 nm from the interface between the cBN grains toward the inner cBN grain of the cBN grains, line L2 being an imaginary line located at a distance of 30 nm from the interface between the cBN grains toward the inner one of the cBN grains. In the present specification, the average value of the oxygen content of the cBN grain is a value calculated from the graph showing the result of element line analysis.

For example, in the graph of FIG. 8, the average value of the oxygen content of the cBN grain is the average value of the oxygen content in a range of −20 nm to −30 nm on the horizontal axis (X axis) (a range indicated by a; a range in which the distance from the interface is more than or equal to 20 nm and less than or equal to 30 nm), or the average value of the oxygen content in a range of 20 nm to 30 nm on the horizontal axis (X axis) (a range indicated by c; a range in which the distance from the interface is more than or equal to 20 nm and less than or equal to 30 nm). It should be noted that when the respective average values of the oxygen contents of the adjacent cBN grains are different from each other (for example, when the average value of the oxygen content in the range indicated by a is different from the average value of the oxygen content in the range indicated by c in the graph of FIG. 8), the larger one of the average values of the oxygen contents is regarded as the average value of the oxygen content of the cBN grain.

In the graph of FIG. 8, a region (range indicated by b) having an oxygen content larger than the above-calculated average value of the oxygen content of the cBN grain corresponds to the first region having an oxygen content larger than the average value of the oxygen content of the cBN grain. When the first region exists, the cubic boron nitride sintered material satisfies the above-described condition (1) (the first region having an oxygen content larger than the average value of the oxygen content of the cBN grain exists).

In the graph of FIG. 8, when the range of the first region (the range indicated by b) on the horizontal axis (X axis) includes X=0, the cubic boron nitride sintered material satisfies the above-described condition (2) (the interface exists in the first region).

In the graph of FIG. 8, when the length (length indicated by D) of the range of the first region (range indicated by b) on the horizontal axis (X axis) is more than or equal to 0.1 nm and less than or equal to 10 nm, the cubic boron nitride sintered material satisfies the above-described condition (3) (the length of the first region along the direction perpendicular to the interface is more than or equal to 0.1 nm and less than or equal to 10 nm).

When the above-described analysis is repeated at six visual fields in the first image and it is confirmed that the above-described conditions (1) to (3) are satisfied in one or more visual fields, the cBN sintered material is regarded as the cBN sintered material according to the present disclosure.

Figure 9:
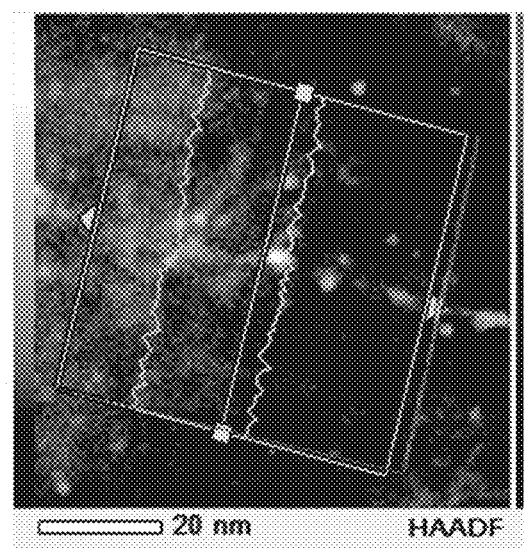
FIG. 9 shows an exemplary second image.

The above-described analysis will be described more in detail with reference to FIGS. 9 and 10 in order to facilitate understanding. FIG. 9 shows an exemplary second image. Referring to FIG. 9, it is considered that a black region corresponds to the cBN grain, a white or gray region corresponds to the binder phase, and a white or gray region corresponds to the interface.

Here, when the width of the white or gray region (substantially the upward/downward direction in FIG. 9) considered to correspond to the interface is more than 10 nm in the second image, reversion is made to the first image to select another interface again. This is due to the following reason: when the width of the white or gray region is more than 10 nm, it is difficult to say that the white or gray region corresponds to the "interface between the cBN grains".

Figure 10:
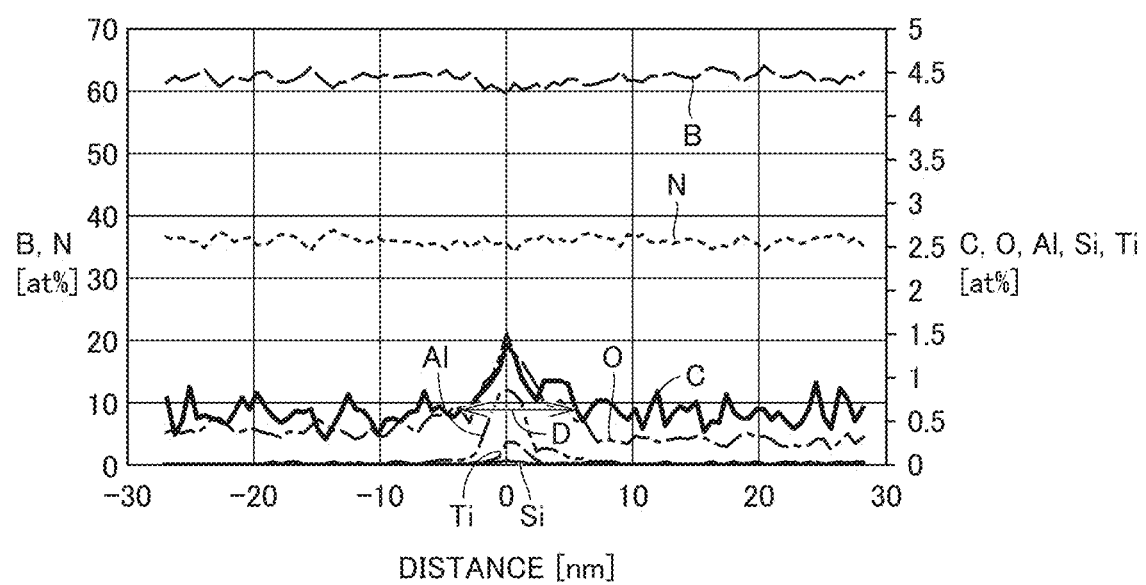
FIG. 10 is an exemplary graph showing a result of element line analysis.

FIG. 10 is an exemplary graph showing a result of element line analysis on the second image. In FIG. 10, the result is indicated by a solid line, where the horizontal axis represents a distance (nm) for which the element line analysis has been performed, and the vertical axis represents the values of boron content, nitrogen content, carbon content, oxygen content, aluminum content, silicon content, and titanium content (atomic %) in spots as calculated from the result of the element line analysis.

In FIG. 10, a portion indicated by a reference character "D" represents the "length of the first region along the direction perpendicular to the interface".

In the cBN sintered material of the present disclosure, the length of the first region along the direction perpendicular to the interface is preferably more than or equal to 0.1 nm and less than or equal to 5 nm, and is more preferably more than or equal to 0.1 nm and less than or equal to 2.5 nm. In this case, when the cBN sintered material is used as a tool material, a longer life of the tool can be attained.

In the cBN sintered material of the present disclosure, a difference between the maximum value of the oxygen content of the first region and the average value of the oxygen content of the cBN grain is preferably more than or equal to 0.1 atomic % and less than or equal to 5 atomic %. Thus, when the cubic boron nitride sintered material is used as a tool material, a longer life of the tool can be attained. Here, the maximum value of the oxygen content of the first region and the average value of the oxygen content of the cBN grain are values calculated from the graph showing the result of the element line analysis on the cBN sintered material.

The difference between the maximum value of the oxygen content of the first region and the average value of the oxygen content of the cBN grain is more preferably more than or equal to 0.1 atomic % and less than or equal to 3.0 atomic %, and is further preferably more than or equal to 0.1 atomic % and less than or equal to 1.5 atomic %.

The maximum value of the oxygen content of the first region is preferably more than or equal to 0.1 atomic % and less than or equal to 5 atomic %. When the maximum value of the oxygen content is more than 5 atomic %, the binding strength between the cBN grains tends to be insufficient. The maximum value of the oxygen content is preferably more than or equal to 0.1 atomic % and less than or equal to 3.0 atomic %, and is more preferably more than or equal to 0.1 atomic % and less than or equal to 1.5 atomic %. Thus, a longer life of the cBN sintered material can be attained.

The average value of the oxygen content of the cBN grain is preferably more than or equal to 0.1 atomic % and less than or equal to 10 atomic %, and is more preferably more than or equal to 0.1 atomic % and less than or equal to 5 atomic %. Thus, a longer life of the cBN sintered material can be attained.

<<Function and Effect>>

When the cBN sintered material of the present disclosure is used as a tool material, a long life of the tool can be attained. This is presumably due to the following reason.

In the cBN sintered material of the present disclosure, the amount of oxygen existing at the interface between the cBN grains is reduced. This is presumably because the binding therebetween was likely to be hindered by the oxygen in the production process. Thus, it is presumed that the binding strength between the cBN grains and the binding strength between the binder phase and the cBN grains are increased.

Second Embodiment: Method of Producing cBN Sintered Material

A method of producing a cBN sintered material according to the present disclosure will be described. The method of producing the cBN sintered material according to the present disclosure includes: a step (hereinafter, also referred to as "forming step") of forming an organic-substance-attached cubic boron nitride powder (hereinafter, also referred to as "organic-substance-attached cBN powder") by attaching an organic substance to a cubic boron nitride powder (hereinafter, also referred to as "cBN powder"); a step (hereinafter, also referred to as "preparing step") of preparing a powder mixture by mixing the organic-substance-attached cubic boron nitride powder and a binder powder; and a step (hereinafter, also referred to as "sintering step") of obtaining the cubic boron nitride sintered material by sintering the powder mixture.

The powder mixture includes more than or equal to 50 volume % and less than 80 volume % of the organic-substance-attached cubic boron nitride powder and more than 20 volume % and less than or equal to 50 volume % of the binder powder. The binder powder includes at least one element selected from a group consisting of a group 4 element, a group 5 element, a group 6 element in a periodic table, and aluminum, and at least one element selected from a group consisting of nitrogen, carbon, boron, and oxygen. Hereinafter, each step will be described in detail.

<<Forming Step>>

This step is a step of forming the organic-substance-attached cBN powder by attaching the organic substance to the cBN powder.

The cBN powder is source material powder for the cBN grains included in the cBN sintered material. The cBN powder is not particularly limited and known cBN powder can be used. $D_{50}$ (average particle size) of the cBN powder is not particularly limited, and can be 0.1 to 12 μm, for example.

Examples of the method of attaching the organic substance to the cBN powder include: a method employing supercritical water; a method of performing plasma treatment; and the like.

(Method Employing Supercritical Water)

The method employing supercritical water will be described. In the method, for example, a step of introducing the cBN powder and the organic substance into supercritical water is performed. Accordingly, the organic-substance-attached cubic boron nitride powder can be formed. It should be noted that in the present specification, the supercritical water refers to water in a supercritical state or a subcritical state.

Examples of the method of introducing the cBN powder and the organic substance into the supercritical water include: a method of introducing the cBN powder into supercritical water having the organic substance dissolved therein. Accordingly, the cBN powder is brought into contact with the supercritical water, thereby cleaning the surfaces of the particles of the cBN powder. Further, the cBN powder including the particles having the cleaned surfaces and the organic substance are brought into contact with each other, with the result that the organic substance is attached on the cleaned surfaces.

When this step is performed using the supercritical water, the organic substance to be used is preferably an amine or a hydrocarbon compound having a carbon number of more than or equal to 5. Among them, hexylamine, hexanenitrile, paraffin and hexane are more preferable. Hexylamine is further preferable. The present inventors have confirmed that when each of these organic substances is used, falling of the cBN grains is dramatically reduced in the cBN sintered material.

(Method of Performing Plasma Treatment)

The method of performing plasma treatment will be described. In the method, for example, in a plasma generation apparatus, the cBN powder is exposed to an atmosphere of first gas including carbon and is then exposed to an atmosphere of second gas including ammonia. As the first gas, $CF_4$, $CH_4$, $C_2H_2$ or the like can be used. As the second gas, $NH_3$, a mixed gas of $N_2$ and $H_2$, or the like can be used.

Thus, since the cBN powder is exposed to the atmosphere of the first gas, the surfaces of the particles of the cBN powder are etched to form the cleaned surfaces, and carbon is attached to the cleaned surfaces. Then, the cBN powder having the carbon attached thereon is exposed to the atmosphere of the second gas, with the result that the carbon is terminated by ammonia. As a result, the organic substance including carbon and nitrogen is attached on the cleaned surfaces.

As described above, the organic-substance-attached cBN powder can be formed by one of the method employing supercritical water and the method of performing plasma treatment. In this step, it is preferable to use the method employing supercritical water. This is due to the following reason: the organic substance to be attached onto the cBN powder can be readily made uniform and therefore the organic-substance-attached cBN powder can be also readily made uniform.

In this step, the average particle size of the cBN powder is not particularly limited. In order to form a cBN sintered material having high strength, high wear resistance, and high breakage resistance, the average particle size of the cBN powder is preferably 0.1 to 10 μm, and is more preferably 0.5 to 5.0 μm.

When this step is performed using plasma treatment, examples of the organic substance to be attached include an amine and the like.

A preferable amount of the organic substance to be attached to the cBN powder is changed depending on the particle size of the cBN powder. For example, when hexylamine is used as the organic substance, it is preferable to use 0.1 to 3000 ppm of hexylamine on a mass basis for a cBN powder having an average particle size of 1 to 10 μm. Further, for a cBN powder having an average particle size of 0.1 to 1 μm, it is preferable to use 0.1 to 1000 ppm of hexylamine on a mass basis. In each of such cases, a desired cBN sintered material tends to be efficiently produced. The amount of the organic substance attached on the organic-substance-attached cBN powder can be measured by, for example, gas chromatography mass spectroscopy.

<<Preparing Step>>

This step is a step of preparing the powder mixture by mixing the organic-substance-attached cBN powder and the binder powder. The organic-substance-attached cBN powder is the organic-substance-attached cBN powder obtained by the above-described forming step, and the binder powder is a source material for the binder phase of the cBN sintered material.

The binder powder can be prepared as follows. First, there is prepared a compound (hereinafter, also referred to as "binder compound") including at least one element selected from the group consisting of the group 4 element, the group 5 element, the group 6 element in the periodic table, and aluminum, and at least one element selected from the group consisting of nitrogen, carbon, boron and oxygen. One of the binder compounds may be solely used or two or more of the binder compounds may be used in combination. The binder compound(s) are pulverized by a wet ball mill, a wet bead mill, or the like, thereby preparing the binder powder.

The mixing ratio of the organic-substance-attached cBN powder and the binder powder is adjusted such that the ratio of the organic-substance-attached cBN powder in the powder mixture is more than or equal to 50 volume % and less than 80 volume % and the ratio of the binder powder is more than 20 volume % and less than or equal to 50 volume %.

It should be noted that the mixing ratio of the organic-substance-attached cBN powder and the binder powder in the powder mixture is substantially the same as the ratio of the cBN grains and the binder phase in the cBN sintered material obtained by sintering the powder mixture. This is because the volume of the organic substance in the organic-substance-attached cBN powder is much smaller than that of the cBN powder. Therefore, by controlling the mixing ratio of the organic-substance-attached cBN powder and the binder powder in the powder mixture, the ratio of the cBN grains and the binder phase in the cBN sintered material can be adjusted to fall within a desired range.

The method of mixing the organic-substance-attached cBN powder and the binder powder is not particularly limited; however, in order to efficiently and uniformly mix the powders, ball mill mixing, bead mill mixing, planetary mill mixing, jet mill mixing, or the like can be used. Each of the mixing methods may be performed in a wet manner or dry manner.

The organic-substance-attached cBN powder and the binder powder are preferably mixed by wet ball mill mixing employing ethanol, acetone or the like as a solvent. After the mixing, the solvent is removed by natural drying. Thereafter, an impurity such as moisture adsorbed on the surfaces is volatilized by heat treatment to clean the surfaces. On this occasion, the organic substance attached on the cBN powder is decomposed by the heat treatment, but carbon remains uniformly on the surfaces to attain surface modification. Thus, the powder mixture is prepared.

The binder powder may include other component(s) in addition to the above-described binder compound(s). Examples of elements of the other component(s) include nickel (Ni), iron (Fe), manganese (Mn), rhenium (Re), and the like.

<<Sintering Step>>

This step is a step of obtaining the cBN sintered material by sintering the powder mixture. In this step, the powder mixture is sintered under a high-temperature and high-pressure condition, thereby producing the cBN sintered material.

Specifically, first, as a first step, the powder mixture is introduced into a container and is vacuum-sealed. Next, as a second step, the vacuum-sealed powder mixture is sintered using an ultra-high temperature and high pressure apparatus. Sintering conditions are not particularly limited, but are preferably 5.5 to 8 GPa, more than or equal to 1500° C. and less than 2000° C., and 5 to 120 minutes. In particular, in view of balance between cost and sinterability, 6 to 7 GPa, 1600 to 1900° C., and 5 to 60 minutes are preferable.

In this step, when no degassing heat treatment is performed in the preparation stage of the powder mixture, the organic substance attached on the organic-substance-attached cBN powder is decomposed by the first step, and remains as carbon on the surfaces of the particles of the cBN powder. When degassing heat treatment is performed in the preparation stage of the powder mixture, carbon originated from the organic substance remains on the surfaces of the particles of the cBN powder. In the second step, the carbon remains on the surfaces of the particles of the organic-substance-attached cBN powder. Therefore, on the surfaces of the particles of the organic-substance-attached cBN powder to be subjected to the second step, carbon does not exist in an imbalanced manner and exists substantially uniformly. By performing the second step onto the powder mixture including such an organic-substance-attached cBN powder, the cBN sintered material is produced.

Third Embodiment: Tool

The cubic boron nitride sintered material according to the present disclosure can be used as a tool material. The tool can include the cBN sintered material as a substrate. Further, the tool may have a coating film on a surface of the cBN sintered material serving as the substrate.

The shape and purpose of use of the tool are not particularly limited. Examples of thereof include a drill, an end mill, an indexable cutting insert for drill, an indexable cutting insert for end mill, an indexable cutting insert for milling, an indexable cutting insert for turning, a metal saw, a gear cutting tool, a reamer, a tap, an insert for crankshaft pin milling, and the like.

Further, the tool according to the present embodiment is not limited to a tool entirely composed of the cBN sintered material, and includes a tool having a portion (particularly, a cutting edge portion or the like) composed of the cBN sintered material. For example, the cutting tool according to the present embodiment also includes a tool in which a base body (supporting body) composed of a cemented carbide or the like has a cutting edge portion composed of the cBN sintered material. In this case, the cutting edge portion is literally regarded as a tool. In other words, even when the cBN sintered material constitutes only a portion of the tool, the cBN sintered material is referred to as a tool.

Since the tool according to the present embodiment includes the above-described cBN sintered material, a long life of the tool can be attained.

Examples

The following describes the present embodiment more specifically by way of examples. However, the present embodiment is not limited by these examples.

<Specimen 1>
<<Forming Step>>

First, organic-substance-attached cBN powder was formed. Specifically, first, supercritical water was formed using a supercritical water synthesis apparatus ("Momicho mini" provided by ITEC) under the following conditions.

Pressure: 35 MPa
Temperature: 379° C.
Flow rate: 2 ml/min

Next, a hexylamine source solution was continuously introduced into the apparatus to attain a hexylamine concentration of 5 weight % in the supercritical water, and a cBN powder having an average particle size of 2 μm was continuously introduced into the apparatus to attain an amount of the cBN powder of 10 weight % in the supercritical water. The rate of introduction of hexylamine on this occasion was set to 2 ml/min. Thus, the cBN powder and the organic substance (hexylamine) were introduced into the supercritical water.

After continuing the above-described supercritical water treatment for 100 minutes, the temperature and pressure in the apparatus was returned to normal temperature and normal pressure, the forming step was ended, and a whole of the obtained slurry was collected. The slurry was centrifuged (at 10000 rpm for 5 minutes) to separate an excess of hexylamine not attached on the cBN powder. The concentrated slurry after the separation was dried (–90° C. for 12 hours) to collect about 20 g of powder having been through the supercritical water treatment (i.e., the organic-substance-attached cBN powder).

In this way, the organic-substance-attached cBN powder was formed. The formed organic-substance-attached cBN powder was subjected to gas chromatography mass spectroscopy, thus confirming that 20.0 ppm of hexylamine existed (was attached) with respect to the cBN powder on the mass basis.

<<Preparing Step>>

The binder powder was prepared in the following procedure. Titanium (Ti) powder, aluminum (Al) powder, and titanium carbide (TiC) powder were mixed at 37:22:41 (weight %) and were subjected to heat treatment of 1500° C. for 30 minutes in a vacuum atmosphere to obtain a binder compound substantially having a $Ti_2AlC$ composition. The binder compound was pulverized to attain an average particle size of 0.5 μm by the ball mill method, thereby forming a first binder powder. Further, titanium carbonitride (TiCN) powder was prepared as a second binder powder. The second binder powder and the first binder powder were mixed at a weight ratio of 1:3 to obtain the binder powder.

The organic-substance-attached cBN powder and the binder powder were blended at the following ratio in volume %: the organic-substance-attached cBN powder: the binder powder=70:30. Then, they were mixed uniformly by the wet ball mill method using ethanol. Then, degassing heat treatment was performed at 900° C. in vacuum to remove an impurity such as moisture on the surfaces thereof The organic-substance-attached cBN powder having been through the degassing heat treatment was analyzed by Auger electron spectroscopy, thus confirming that carbon remained on the surfaces of the particles of the organic-substance-attached cBN powder. In this way, the powder mixture was prepared.

<<Sintering Step>>

Next, the obtained powder mixture was sintered to produce a cBN sintered material. Specifically, the powder mixture was introduced into a container composed of Ta, the container was vacuum-sealed, and sintering was performed at 6.5 GPa and 1700° C. for 15 minutes using a belt-type ultra-high-pressure high-temperature generation apparatus. Thus, the cBN sintered material was produced.

<Specimen 2>

A cBN sintered material was produced in the same manner as in Specimen 1 except that the rate of introduction of hexylamine was set to 1.5 ml/min in the forming step, and the organic-substance-attached cBN powder and the binder powder were blended in the preparing step at the following ratio in volume %: the organic-substance-attached cBN powder: the binder powder=65:35.

<Specimen 3>

A cBN sintered material was produced in the same manner as in Specimen 1 except that the rate of introduction of hexylamine was set to 2 ml/min in the forming step, and the organic-substance-attached cBN powder and the binder powder were blended in the preparing step at the following ratio in volume %: the organic-substance-attached cBN powder: the binder powder=75:25.

<Specimen 4>

A cBN sintered material was produced in the same manner as in Specimen 1 except that the rate of introduction of hexylamine was set to 3 ml/min in the forming step.

<Specimen 5>

A cBN sintered material was produced in the same manner as in Specimen 1 except that the rate of introduction of hexylamine was set to 3 ml/min in the forming step, and the organic-substance-attached cBN powder and the binder powder were blended in the preparing step at the following ratio in volume %: the organic-substance-attached cBN powder: the binder powder=60:40.

<Specimen 6>

A cBN sintered material was produced in the same manner as in Specimen 1 except that the rate of introduction of hexylamine was set to 3.5 ml/min in the forming step, and the organic-substance-attached cBN powder and the binder powder were blended in the preparing step at the following ratio in volume %: the organic-substance-attached cBN powder: the binder powder=60:40.

<Specimen 7>

A cBN sintered material was produced in the same manner as in Specimen 1 except that the rate of introduction of hexylamine was set to 3 ml/min in the forming step, and the organic-substance-attached cBN powder and the binder powder were blended in the preparing step at the following ratio in volume %: the organic-substance-attached cBN powder: the binder powder=79:21.

<Specimen 8>
A cBN sintered material was produced in the same manner as in Specimen 1 except that the rate of introduction of hexylamine was set to 3 ml/min in the forming step, and the organic-substance-attached cBN powder and the binder powder were blended in the preparing step at the following ratio in volume %: the organic-substance-attached cBN powder: the binder powder=50:50.

<Specimen 9>
A cBN sintered material was produced in the same manner as in Specimen 1 except that plasma treatment was employed in the forming step instead of the method employing supercritical water. The forming step is performed in the following manner: cBN powder was set in a chamber of a plasma modification apparatus (low-pressure plasma apparatus FEMTO provided by Dienner) and $CF_4$ gas was introduced to perform treatment for 30 minutes under conditions of a degree of vacuum of 30 Pa, an electric power of 1500 W, and a frequency of 13.56 MHz. Then, $NH_3$ gas was introduced to perform treatment for 30 minutes. Thus, an organic-substance-attached cBN powder having carbon and nitrogen introduced therein was formed.

<Specimen 10>
A cBN sintered material was produced in the same manner as in Specimen 9 except that the time of the treatment after introducing the $CF_4$ gas was changed to 5 minutes in the forming step.

<Specimen 11>
A cBN sintered material was produced in the same manner as in Specimen 9 except that the time of the treatment after introducing the $NH_3$ gas was changed to 15 minutes in the forming step.

<Specimen 12>
A cBN sintered material was produced in the same manner as in Specimen 9 except that the organic-substance-attached cBN powder and the binder powder were blended in the preparing step at the following ratio in volume %: the organic-substance-attached cBN powder: the binder powder=55:45.

<Specimen 13>
A cBN sintered material was produced in the same manner as in Specimen 9 except that the organic-substance-attached cBN powder and the binder powder were blended in the preparing step at the following ratio in volume %: the organic-substance-attached cBN powder: the binder powder=76:24.

<Specimen 14>
A cBN sintered material was produced in the same manner as in Specimen 1 except that the organic-substance-attached cBN powder and the binder powder were blended in the preparing step at the following ratio in volume %: the organic-substance-attached cBN powder: the binder powder=45:55.

<Specimen 15>
A cBN sintered material was produced in the same manner as in Specimen 1 except that the organic-substance-attached cBN powder and the binder powder were blended in the preparing step at the following ratio in volume %: the organic-substance-attached cBN powder: the binder powder=80:20.

<Specimen 16>
A cBN sintered material was produced in the same manner as in Specimen 1 except that no forming step was performed and the cBN powder and the binder powder were blended at the following ratio in volume %: the cBN powder: the binder powder=50:50.

[Evaluations]
<<Content Ratios of cBN Grains and Binder Phase>>
In each of the cBN sintered materials of Specimens 1 to 16, the content ratio (volume %) of the cBN grains and the content ratio (volume %) of the binder phase were measured using an energy dispersive X-ray analysis device (EDX) accompanied with a scanning electron microscope (SEM). A specific measurement method has been described in the first embodiment, and therefore will not be described repeatedly. Results are shown in the columns "cBN Grain Content Ratio (volume %)" and "Binder Phase Content Ratio (volume %)" in Table 1.

As a result of the measurement, in each of the cBN sintered materials of Specimens 1 to 16, it was confirmed that the content ratio of the cBN grains and the content ratio of the binder phase in the cBN sintered material were maintained to be the same as the content ratio of the organic-substance-attached cBN powder (cBN powder in Specimen 16) and the content ratio of the binder powder in the total (volume %) (i.e., powder mixture) of the organic-substance-attached cBN powder (cBN powder in Specimen 16) and the binder phase powder.

<<Composition of Binder>>
Each of the compositions of the binder phases of the cBN sintered materials of Specimens 1 to 16 was measured using XRD (X-ray diffraction measurement) and ICP. A specific measurement method has been described in the first embodiment, and therefore will not be described repeatedly.

As a result of the measurement, it was confirmed that titanium (Ti), aluminum (Al), carbon (C), nitrogen (N), boron (B) and oxygen (O) existed in the binder phase of the cBN sintered material of each of Specimens 1 to 16.

<<Length of First Region Along Direction Perpendicular to Interface, Maximum Value of Oxygen Content of First Region, and Average Value of Oxygen Content of cBN Grain>>
In each of the cBN sintered materials of Specimens 1 to 16, the length of the first region along the direction perpendicular to the interface (hereinafter, also referred to as "the length of the first region"), the maximum value of the oxygen content of the first region, and the average value of the oxygen content of the cBN grain were measured by element mapping analysis and element line analysis using TEM-EDX. Specific measurement methods have been described in the first embodiment, and therefore will not be described repeatedly. It should be noted that the thickness of each sample was 50 nm, a beam diameter in the EDX was 0.2 nm, and a scanning interval was 0.6 nm.

In each of the samples of Specimens 1 to 16, the above-described measurements were performed for each of six arbitrarily extracted regions.

In each of Specimens 1 to 16, it was confirmed that the first region existed in each of all the six visual fields of each sample and the interface existed in the first region. The average values of the results in the six visual fields are shown in the columns "Length of First Region (nm)", "Maximum Value M2 of Oxygen Content of First Region (atomic %)", and "Average Value M1 of Oxygen Content of cBN Grain (atomic %)" in Table 1.

<<Cutting Test>>
A cutting tool (substrate shape: CNGA120408; cutting edge process: T01215) was produced using the cBN sintered material of each of Specimens 1 to 16. A cutting test was performed using this cutting tool under the following cutting conditions.
Cutting speed: 170 m/min.
Feeding speed: 0.2 mm/rev.
Depth of cut: 0.16 mm Coolant: DRY
Cutting method: intermittent cutting
Lathe: LB400 (provided by OKUMA Corporation)
Workpiece: SKD11 (HRC62), a workpiece with a V groove The cutting edge was observed per cutting distance of 0.2 km so as to measure an amount of chipping. The amount of chipping was measured as a reduced width from the position of the ridgeline of the cutting edge before the cutting. The reduced width results from wear. A cutting distance at a point of time at which the amount of chipping became more than or equal to 0.02 mm was measured. It should be noted that a longer cutting distance indicates a longer life of the cutting tool. Results are shown in the column "Cutting Distance (km)" in Table 1.

TABLE 1

| Specimen No. | cBN Grain Content Ratio (volume %) | Binder Phase Content Ratio (volume %) | Length of First Region (nm) | Maximum Value M2 of Oxygen Content of First Region (atomic %) | Average Value M1 of Oxygen Content of cBN Grains (atomic %) | M2 − M1 (atomic %) | Cutting Distance (km) |
|---|---|---|---|---|---|---|---|
| 1 | 70 | 30 | 2.2 | 2.0 | 0.5 | 1.5 | 2.6 |
| 2 | 65 | 35 | 3.2 | 2.2 | 0.4 | 1.8 | 2.4 |
| 3 | 75 | 25 | 4.5 | 2.7 | 0.3 | 2.4 | 2.4 |
| 4 | 70 | 30 | 7.2 | 4.6 | 0.4 | 4.2 | 1.8 |
| 5 | 60 | 40 | 4.8 | 4.4 | 0.4 | 3.9 | 1.8 |
| 6 | 60 | 40 | 6.2 | 4.9 | 0.6 | 4.3 | 1.6 |
| 7 | 79 | 21 | 6.5 | 4,7 | 0.5 | 4.2 | 1 |
| 8 | 50 | 50 | 6.1 | 4.8 | 0.4 | 4.4 | 1 |
| 9 | 70 | 30 | 2.6 | 3.0 | 0.2 | 2.8 | 2.4 |
| 10 | 70 | 30 | 8.6 | 5.5 | 0.4 | 5.1 | 1.2 |
| 11 | 70 | 30 | 6.2 | 4.9 | 0.5 | 4.4 | 1.6 |
| 12 | 55 | 45 | 3.6 | 4.8 | 0.6 | 4.2 | 1.8 |
| 13 | 76 | 24 | 3.4 | 4.5 | 0.7 | 3.8 | 1.6 |
| 14 | 45 | 55 | 4.1 | 3.6 | 0.6 | 3 | 0.4 |
| 15 | 80 | 20 | 3.5 | 3.4 | 0.5 | 2.9 | 0.6 |
| 16 | 50 | 50 | 11.8 | 7.0 | 0.6 | 6.4 | 0.6 |

[Review]

Each of the methods of producing the cBN sintered materials of Specimens 1 to 13 corresponds to an example of the present disclosure. Each of the cBN sintered materials of Specimens 1 to 13 corresponds to an example of the present disclosure. In the case of each of the tools using the cBN sintered materials of Specimens 1 to 13, the cutting distance and the tool life were long.

In the method of producing the cBN sintered material of Specimen 14, the content ratio of the organic-substance-attached cBN powder in the powder mixture was less than 50 volume %, and the method of producing the cBN sintered material of Specimen 14 corresponds to a comparative example. The content ratio of the cBN grains of the cBN sintered material of Specimen 14 was less than 50 volume % and the cBN sintered material of Specimen 14 corresponds to a comparative example. In the case of the tool using the cBN sintered material of Specimen 14, the cutting distance and the tool life were short.

In the method of producing the cBN sintered material of Specimen 15, the content ratio of the organic-substance-attached cBN powder in the powder mixture was 80 volume %, and the method of producing the cBN sintered material of Specimen 15 corresponds to a comparative example. The content ratio of the cBN grains of the cBN sintered material of Specimen 15 was 80 volume % and the cBN sintered material of Specimen 15 corresponds to a comparative example. In the case of the tool using the cBN sintered material of Specimen 15, the cutting distance and the tool life were short.

The method of producing the cBN sintered material of Specimen 16 does not use the organic-substance-attached cBN powder and corresponds to a comparative example. In the cBN sintered material of Specimen 16, the length of the first region was more than 10 nm and the cBN sintered material of Specimen 16 corresponds to a comparative example. In the case of the tool using the cBN sintered material of Specimen 16, the cutting distance and the tool life were short.

Heretofore, the embodiments and examples of the present disclosure have been illustrated, but it has been initially expected to appropriately combine the configurations of the embodiments and examples and modify them in various manners.

The embodiments and examples disclosed herein are illustrative and non-restrictive in any respect. The scope of the present invention is defined by the terms of the claims, rather than the embodiments and examples described above, and is intended to include any modifications within the scope and meaning equivalent to the terms of the claims.

REFERENCE SIGNS LIST

1: cubic boron nitride grain; 3: interface
The invention claimed is:
1. A cubic boron nitride sintered material comprising: more than or equal to 50 volume % and less than 80 volume % of cubic boron nitride grains; and more than 20 volume % and less than or equal to 50 volume % of a binder phase, wherein
    the binder phase includes at least one selected from a group consisting of a compound composed of at least one element selected from a group consisting of a group 4 element, a group 5 element, a group 6 element in a periodic table, and aluminum, and at least one element selected from a group consisting of nitrogen, carbon, boron, and oxygen, and a solid solution originated from the compound, and
    when an oxygen content is measured in a direction perpendicular to an interface between cubic boron nitride grains using TEM-EDX, a first region having an oxygen content larger than an average value of an oxygen content of a cubic boron nitride grain exists, the interface exists in the first region, and a length of the first region along the direction perpendicular to the interface is more than or equal to 0.1 nm and less than or equal to 10 nm.

2. The cubic boron nitride sintered material according to claim 1, wherein a content ratio of the cubic boron nitride grains is more than or equal to 55 volume % and less than or equal to 75 volume %.

3. The cubic boron nitride sintered material according to claim 1, wherein the length of the first region along the direction perpendicular to the interface is more than or equal to 0.1 nm and less than or equal to 5 nm.

4. The cubic boron nitride sintered material according to claim 1, wherein a difference between a maximum value of the oxygen content of the first region and the average value of the oxygen content of the cubic boron nitride grain is more than or equal to 0.1 atomic % and less than or equal to 5 atomic %.

5. The cubic boron nitride sintered material according to claim 4, wherein the difference between the maximum value of the oxygen content of the first region and the average value of the oxygen content of the cubic boron nitride grain is more than or equal to 0.1 atomic % and less than or equal to 3 atomic %.

* * * * *